(12) United States Patent
Wong et al.

(10) Patent No.: US 6,816,734 B2
(45) Date of Patent: Nov. 9, 2004

(54) METHOD AND APPARATUS FOR IMPROVED LOCATION DETERMINATION IN A PRIVATE RADIO NETWORK USING A PUBLIC NETWORK SYSTEM

(75) Inventors: Chin Pan Wong, Coral Springs, FL (US); Jose E. Korneluk, Boynton Beach, FL (US); Deborah Monks, Palatine, IL (US); Charles Jackson, Crystal Lake, IL (US); Brian K. Larson, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 7 days.

(21) Appl. No.: 10/245,244

(22) Filed: Sep. 17, 2002

(65) Prior Publication Data

US 2004/0192335 A1 Sep. 30, 2004

(51) Int. Cl.[7] ................................................ H04Q 7/20
(52) U.S. Cl. ............................... 455/456.1; 455/456.2; 455/456.3
(58) Field of Search .......................... 455/456.1, 456.2, 455/456.3, 456.6, 457; 342/357.06, 357.07

(56) References Cited

U.S. PATENT DOCUMENTS

| 6,327,533 B1 | * | 12/2001 | Chou ...................... 455/456.1 |
| 6,603,800 B1 | * | 8/2003 | Mesecher ................ 455/456.5 |
| 2002/0000930 A1 | * | 1/2002 | Crowson et al. ......... 342/357.1 |
| 2003/0117316 A1 | * | 6/2003 | Tischer ....................... 455/456 |

* cited by examiner

Primary Examiner—David Hudspeth
Assistant Examiner—Huy Nguyen
(74) Attorney, Agent, or Firm—Barbara R. Doutre

(57) ABSTRACT

Location information is acquired through a public network system (102, 106) and transferred over to a private network system (104, 108) in order to improve location accuracy and reduce search time for a two-way radio (104).

8 Claims, 2 Drawing Sheets

METHOD AND APPARATUS FOR IMPROVED LOCATION DETERMINATION IN A PRIVATE RADIO NETWORK USING A PUBLIC NETWORK SYSTEM

CROSS REFERENCE TO RELATED APPLICATIONS:

This application is related to U.S. applications Ser. No. 10/245,221, by Wong et al., entitled "Bridging Talk Groups in a Communication System," filed concurrently herewith, Ser. No. 10/245,134 by Claxton et al., entitled "Accessory for a Mobile Communication System," Ser. No. 10/245,097 by Richards et al., entitled "Charging Device for Charging a Plurality of Devices," and Ser. No. 10/245,137 by Richards et al., entitled "Portable Communication Device used as an Accessory for a Portable Two-Way Radio," each assigned to Motorola, Inc.

BACKGROUND OF THE INVENTION

1. Field of the Invention

This invention relates in general to communication systems and in particular to systems for communication of location sensitive information in public and private systems.

2. Description of the Related Art

Satellite navigational systems provide a means of locating and tracking communications devices. These systems include Navstar, GPS, and other systems that comprise a plurality of space vehicles (SV) or satellites making up constellations. The Global Positioning System (GPS) is a worldwide radio-navigation system formed from a constellation of twenty-four satellites and their ground stations. GPS uses these "man-made stars" as reference points to calculate positions accurate to a matter of meters. The GPS receiver uses the satellites in space as reference points for locations here on earth. The GPS receiver measures distance using the travel time of radio signals. The GPS receiver has very accurate timing to measure travel time. Along with distance, the GPS receiver knows where the satellites are in space. Finally, the GPS receiver corrects for any delays the signal experiences as it travels through the atmosphere.

Public safety agencies need to track the location of their personnel within and outside of their vehicles. Currently, in the mobile radio environment, location data is acquired from the position of the mobile radio. However, as public safety personnel move away from their vehicles, the location information becomes less accurate as the information remains associated with the vehicle as opposed to the individual. It would be preferable to have the GPS location information more closely associated with the individual. Improvements in location search time and accuracy are also beneficial.

Disadvantageous to having GPS information transferred from a portable device is the added cost and size requirements associated with the inclusion of onboard location determining components. However, with the increase in the number of devices worn by public safety personnel, it would be beneficial to incorporate as much functionality into existing devices as possible.

What is needed is a communication system and method for facilitating the identification of location sensitive information for a portable device with improved precision location and improved search time.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

Figure 1:
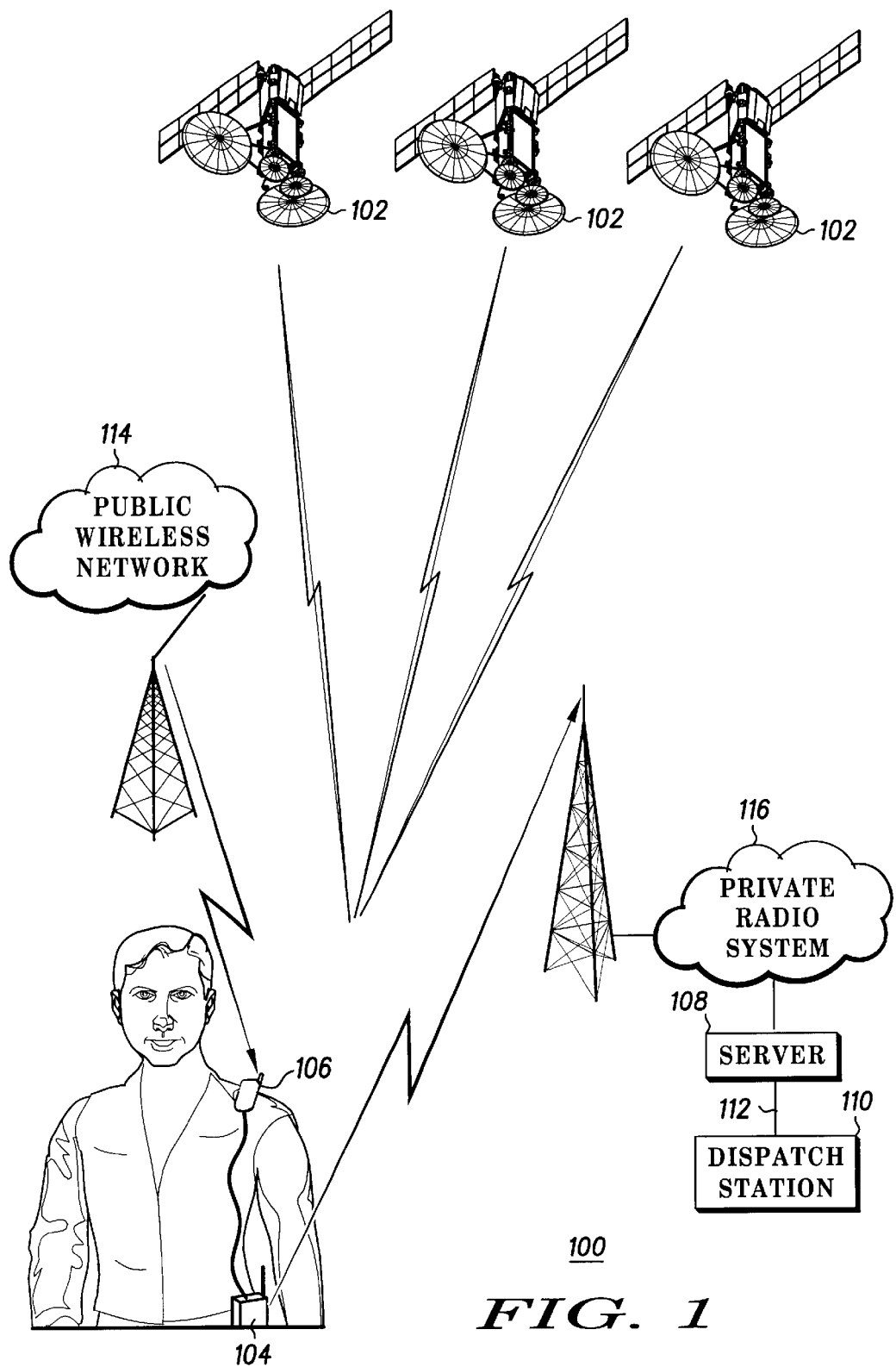
FIG. 1 is a block diagram of a communication system having a communication system in accordance with the present invention.

FIG. 1 includes a plurality of devices operating within a communication system 100 formed in accordance with the present invention. Communication system 100 includes a plurality of satellites 102, a two-way radio 104 having a communication unit 106 coupled thereto, a location server (preferably an Automotive Vehicular Location (AVL)/Personnel Location server) 108, dispatch station 110, a public wireless network 114, and private radio system 116. Satellite 102 is part of a satellite navigational system (i.e. Navstar, GPS) comprising a plurality of space vehicles/satellites forming constellations. Communication system 100 includes both public and private network functionality. The public network includes the satellites 102 (as part of the navigational system), public wireless network 114, and the communication device 106. The communication device 106 includes an RF receiver that receives location information in the form of location assist data from the public network. Location assist data includes but is not limited to location, frequency, and time. In accordance with the present invention, location assist data is generated through the public network to facilitate obtaining a fix with improved search time and tracking of the portable two-way radio within the private network. The private network includes the two-way radio 104 and the server 108. One group dedicates private two-way radios for use, say a fire department or police department. In accordance with the present invention, the user is wearing the two-way radio 104 (a part of the private system) and communication device 106 (a part of the public system) electrically coupled thereto.

In operation, the public network provides location aiding information from satellite 102 to the communication unit 106 operating within the public network, the communication unit 106 then relays the location information to the portable two-way radio 104. Communication device 106 transfers the location information to the two-way radio using a well-known communications link, for example RS-232, USB, BLUETOOTH or other communication link known in the art. The portable two-way radio 104 forwards the location information to the server 108, and the server forwards the location information to the dispatch station 110. Thus, the public network has been used to facilitate the location of the private radio. Obtaining the location fix through the public network using location assist data is faster than obtaining the fix via an autonomous location fix in a private network.

As mentioned previously, wearable communication device 106 includes an RF receiver. The RF receiver can be embodied within a variety of wearable devices. For example, the wearable communication device 106 can comprise a cellular telephone having GPS capability. As another alternative, wearable communication device 106 can be a cellular telephone having GPS capability within the public network and remote speaker microphone capability within the private network. Wearable communication device 106 can further include personal data assistant (PDA) capability. These wearable devices provide smart accessory capability. The coupling between the communication device 106 and the portable two-way radio may be wired or wireless.

Figure 2:
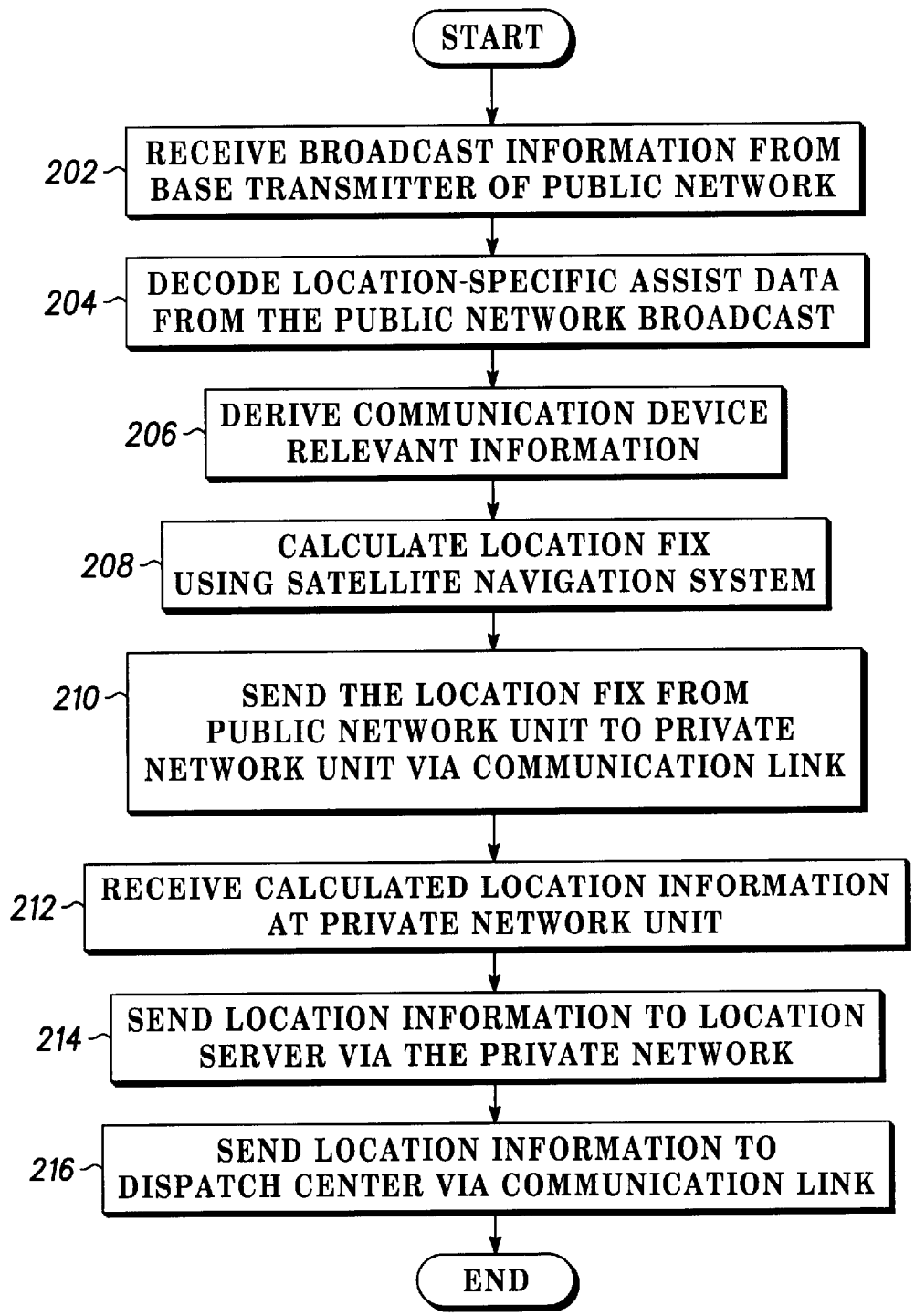
FIG. 2 a flow chart in accordance with the present invention.

FIG. 2 shows a flowchart depicting a method 200 of acquiring location information in accordance with the present invention. Method 200 begins at step 202 with receiving broadcast information from the base transmitter of the public wireless network 114. Location specific information is then decoded from the public network broadcast at step 204. Relevant information from the specific assist data is derived at step 206. A location fix is calculated from the relevant information using the satellite navigational system, this fix can include latitude, longitude, altitude, compass heading, and velocity to name a few of the parameters at step 208. The calculated location fix is then sent to a private network unit at step 210. The calculated location fix is received at the private network unit at step 212 and then sent to a server via a private network system at step 214. Finally, the location fix is sent to a dispatch center at step 216.

An alternative embodiment is to have the portable two-way radio and communication unit formed as part of a unitary device worn by the user. The wearable device ensures accurate location determination of the individual.

Another alternative embodiment for communication system 100 of FIG. 1 is found in the mobile arena where location of a user within a vehicle (not shown) and relative location of the user from the vehicle can be determined through the use of the Automotive Vehicular Location capability of server 108 of FIG. 1. Location tracking capability can be included in the mobile radio and/or in the computer or in a stand-alone receiver, such as a GPS receiver. In accordance with this alternative embodiment, location information is passed over the public network from public network subscribers, through the private network system, to the server 108. The AVL server 108 manages: vehicle locations (generated from private system hardware and software) as well as notification to dispatch center 110 of the relative location of the vehicle with respect to the individual, the location of the individual, and the individual's movement in the vehicle and outside the vehicle. Signaling travels from the wearable accessory 106 to the two-way radio 104 then to the AVL server 108 or to the mobile radio or to a mobile computer. Alternatively, the coupling between the wearable communication device 106 and the mobile radio or mobile computer can be achieved through a direct wireless link. The mobile computer makes the determination of whether to send the location information to the server or to take action within the vehicle itself. If no mobile computer is used then the signaling is forwarded directly to the server via the private network. Vehicular applications that can take advantage of the location information generated by the communication system include controlling video camera directions and triggering real time video and image transmissions. Thus, by combining two locations sources via a smart accessory, the tracking of an individual's location, such as a public safety officer's location, is improved.

Accordingly, there has been provided a communication system in which location information is shared between public radios and private radios. Acquiring location information of a public communication device through a public system and then transferring the location information to a private communication device operating within a private system provides the advantages of improved location accuracy and Time to First Fix (TTFF).

Although the invention has been described in terms of preferred embodiments, it will be obvious to those of ordinary skill in the art that various alterations and modifications may be made without departing from the invention. Accordingly, it is intended that all such alterations and modifications be considered as within the spirit and scope of the invention as defined by the appended claims.

What is claimed is:

1. A location tracking communication system, comprising:
   a satellite navigational system;
   a portable two-way radio operating within a private network;
   a dispatch station operating within the private network;
   a wearable communication device coupled to the portable two-way radio, the wearable communication device operating within a public network;
   a server for relaying location specific assist data, including location, frequency and time, between the portable two-way radio through the private network to the dispatch station; and
   a constellation providing location specific assist data to the wearable communication device operating within the public network, the wearable communication device relaying the location specific assist data to the portable two-way radio, the portable two-way radio forwarding the location specific assist data to the server, the server forwarding the location specific assist data to the dispatch station.

2. The communication system of claim 1, wherein the wearable communication device comprises a radio frequency (RF) receiver.

3. The communication system of claim 1, wherein the wearable communication device comprises a cellular telephone having GPS capability.

4. The communication system of claim 1, wherein the location specific assist data includes GPS assist data.

5. The communication system of claim 1, wherein the wearable communication device comprises a cellular telephone having GPS capability within the public network and remote speaker microphone capability within the private network.

6. The communication system of claim 1, wherein the coupling between the wearable communication device and the portable two-way radio is wired.

7. The communication system of claim 1, wherein the coupling between the wearable communication device and the portable two-way radio is wireless.

8. The communication system of claim 1, wherein the wearable communication device and portable two-way radio are formed as part of a unitary device.

* * * * *